United States Patent

Sato et al.

[11] Patent Number: 5,995,083
[45] Date of Patent: Nov. 30, 1999

[54] COORDINATES INPUT APPARATUS

[75] Inventors: Tadamitsu Sato, San Jose, Calif.; Tsuyoshi Ogura; Akihisa Itoh, both of Fukushima-ken, Japan

[73] Assignee: Alps Electric Co., Ltd., Japan

[21] Appl. No.: 08/752,764

[22] Filed: Nov. 20, 1996

[51] Int. Cl.[6] .................................................. G09G 5/00
[52] U.S. Cl. ......................... 345/173; 345/177; 178/18; 178/19
[58] Field of Search ................................ 345/173, 177 A, 345/174, 175, 176; 178/18, 19; 361/683

[56] References Cited

U.S. PATENT DOCUMENTS

| 4,550,221 | 10/1985 | Mabusth ..................................... | 178/18 |
| 5,327,161 | 7/1994 | Logan et al. ............................. | 345/157 |
| 5,428,367 | 6/1995 | Mikan ...................................... | 345/157 |
| 5,748,185 | 5/1998 | Stephan et al. .......................... | 345/173 |

FOREIGN PATENT DOCUMENTS 0 725 331   8/1996   European Pat. Off. .

*Primary Examiner*—Edward Lefkowitz
*Assistant Examiner*—Davetta Woods
*Attorney, Agent, or Firm*—Brinks Hofer Gilson & Lione

[57] ABSTRACT

An object of the present invention is to provide a coordinates input apparatus whereby various operations on a screen can be carried out where practicable with one finger, and the number of operations reduced, thus giving a marked improvement in user operability. The coordinates input apparatus of the invention therefore comprises a detection section and an operating section. The detection section is provided with an operating surface for operation by a coordinates pointer such as a finger, and detects the operating conditions on the operating surface caused by the coordinates pointer. The operating section executes screen operations corresponding to the operating condition detected by the detection section, and in addition detects tapping of the coordinates pointer on the operating surface within a predetermined region, and carries out previously determined processing.

14 Claims, 6 Drawing Sheets

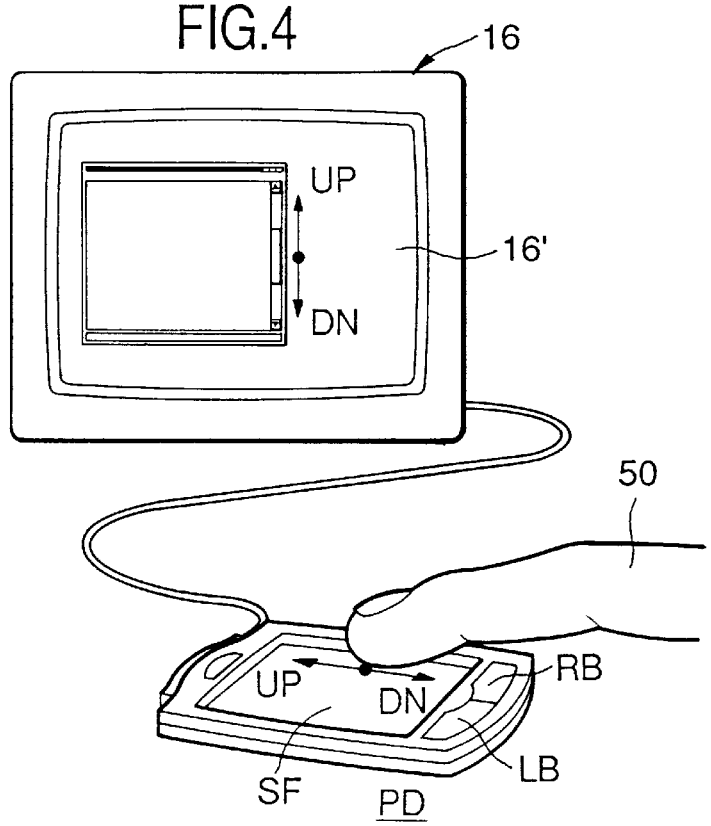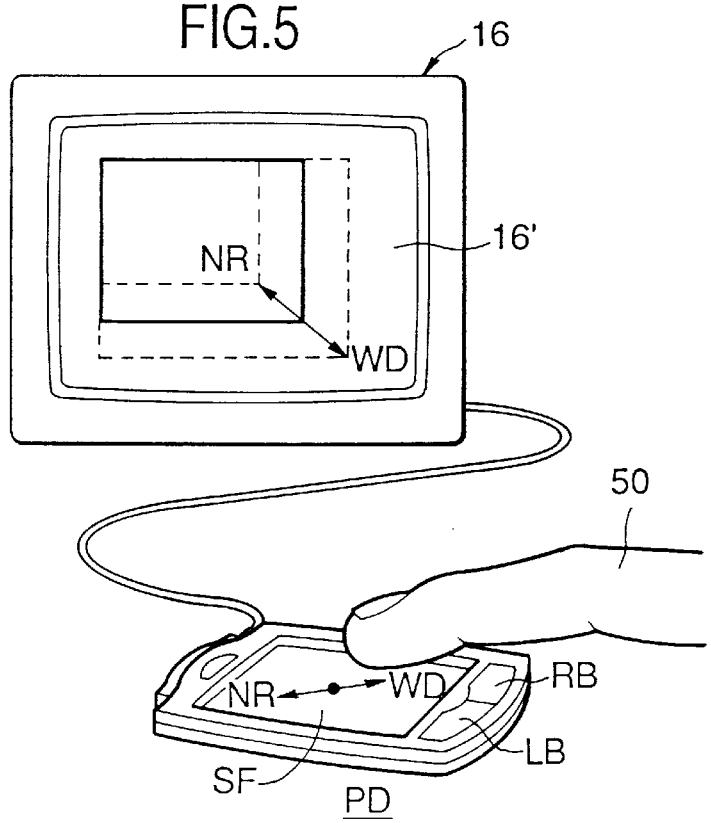

5,995,083

COORDINATES INPUT APPARATUS

BACKGROUND OF THE INVENTION

1. Field of the Invention

The present invention relates to a coordinates input apparatus for operating such as a cursor or a window on a screen.

2. Description of the Related Art

Conventionally a mouse or a track ball is used for the pointing device connected to a computer. Moreover, recently pointing devices such as pads, touch pads or track pads have also come to be used. The pad is used either in an integral form such as with a portable type computer, or in an externally attached form such as with a desk top type computer. Since it is not necessary to move the pad, as with a mouse, it has the feature that it can be operated even in a limited space such as on a desk-top without obstruction.

In moving a cursor (also referred to as a pointer) on a screen using such a pad, the finger may simply be placed on and slid over the small (a few square centimeters) operating surface on the pad. The pad is provided with left and right buttons as with mouse type devices, and in addition various operations the same as for left button clicking, such as selecting and moving an object displayed on the screen can be realized by lightly tapping the operating surface with the finger. This operation is in particular referred to as "tap" or "tapping." By means of this tapping operation, then as well as the above-mentioned clicking operation, operations such as left button double clicking where the left button is clicked two times in succession (used for example in starting an application), and drag (where the cursor is aligned with the screen object and the object moved to a desired location while pressing the left button) can be carried out with one finger.

By operating the operating surface of the pad with the finger above manner, the pad achieves the same function as the cursor moving and left button click operations using the mouse. However, with the conventional pad, the same function as the mouse right button click operation cannot be achieved by an operation on the operating surface. Hence it is necessary to click a right button provided on the pad with the finger, as with a mouse. To carry out the right button click operation, the following operations are required. First, in the case where the user wishes to operate the pad continuously using only one finger, the finger is moved from the operating surface to the right button location, and the right button then pressed with the finger to carry out the click operation. Moreover, in the case where the user operates the pad with two fingers, the operating surface is operated with one finger, while the other finger is placed at the right button location to carry out the click operation. Therefore, to carry out the right button click operation, it is necessary to either operate the pad with two fingers, or to move one finger back and forth between the operating surface and the right button. Hence, the advantages of the present pad in that it can be operated with only a minimal number of one finger operations is lessened.

Moreover, with the latest computers wherein operation of a window (that is to say a plurality of separate screens on the display unit) is a prerequisite, user operations such as adjusting the size of the window to suit the work conditions, scrolling the contents displayed in the window up and down or sideways within the window (the method of successively displaying the screen contents as a scroll), or closing an unnecessary window, are frequently carried out.

Here adjustment of the window size is carried out for example by moving the cursor while clicking on the right hand lower corner of the window. Moreover, to scroll in the window, it is necessary to move the cursor to a so called scroll bar (or slide bar ) provided at the right edge or bottom edge of the window, and then click the scroll bar a required number of times. Furthermore, closing the window is carried out by moving the cursor to a small box, referred to as a close box, provided for example on the upper right corner of the window, and clicking on this box.

In carrying out the various window operations in this way, various combinations of cursor movement and the button clicking are required. Hence if the right button finger clicking operation is included, then the above-mentioned advantages of the pad are not fully realized. Moreover, positioning the cursor on the screen using the pad is not considered easy, even for a user skilled in pad operation, and hence considering a normal user these operations are quite complicated, thus putting a load on the user.

SUMMARY OF THE INVENTION

In view of the above, it is an object of the present invention to provide a coordinates input apparatus whereby various operations on a screen can be carried out where practicable with one finger, and the number of operations reduced, thus giving a marked improvement in user operability.

Accordingly, the coordinates input apparatus according to the present invention comprising detection means having an operating surface for operation by a coordinates pointer, and for detecting an operating condition on said operating surface caused by said coordinates pointer; and operating means for executing screen operations corresponding to said operating condition, wherein said operating means detects tapping of said coordinates pointer on said operating surface within a predetermined region, and carries out previously determined processing.

Moreover, the coordinates input apparatus according to the present invention comprising detection means having an operating surface for operation by a coordinates pointer, and for detecting an operating condition on said operating surface caused by said coordinates pointer; and operating means for executing screen operations corresponding to said operating condition, wherein said operating means detects tapping of said coordinates pointer on said operating surface within a predetermined region, and changes to a previously determined mode.

In this way, with the present invention, it is possible to execute various processing and to change to a predetermined mode, by merely tapping a region on the operating surface with the coordinates pointer. Therefore, as well as negating the requirement as with the conventional coordinates input apparatus, of the complicated cursor positioning operation, it is not necessary to move the finger from the operating surface to the button and click the button. Hence basically an extremely simple operation using only one finger can be realized, the number of operations reduced, and the load on the user considerably lightened.

BRIEF DESCRIPTION OF THE DRAWINGS

FIG. 4 is a diagram for explaining an operation in the embodiment for Easy Scroll;

FIG. 5 is a diagram for explaining an operation in the embodiment for Easy Size;

DESCRIPTION OF THE PREFERRED EMBODIMENT

Figure 1:
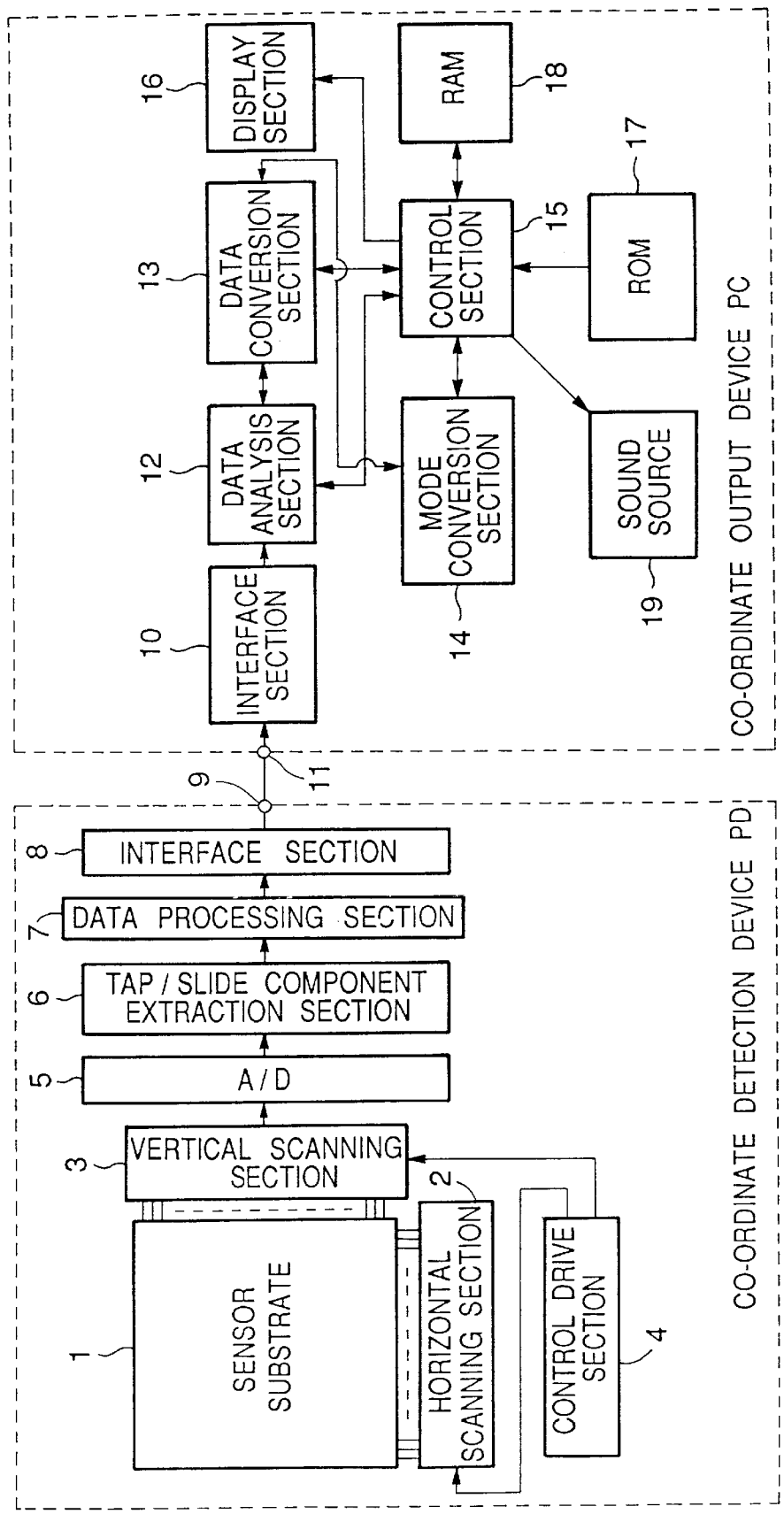
FIG. 1 is block diagram showing the structure of a coordinates input apparatus according to an embodiment of the present invention.

An embodiment of the present invention will now be described with reference to the drawings. FIG. 1 is block diagram showing the structure of a coordinates input apparatus according to the embodiment. As shown in FIG. 1, the coordinates input apparatus is made up generally from two devices namely; a coordinates detection device PD, and a coordinates output device PC. The coordinates detection device PD is for example the above-mentioned pad, while the coordinates output device PC is for example a computer connected to the pad.

Figure 2:
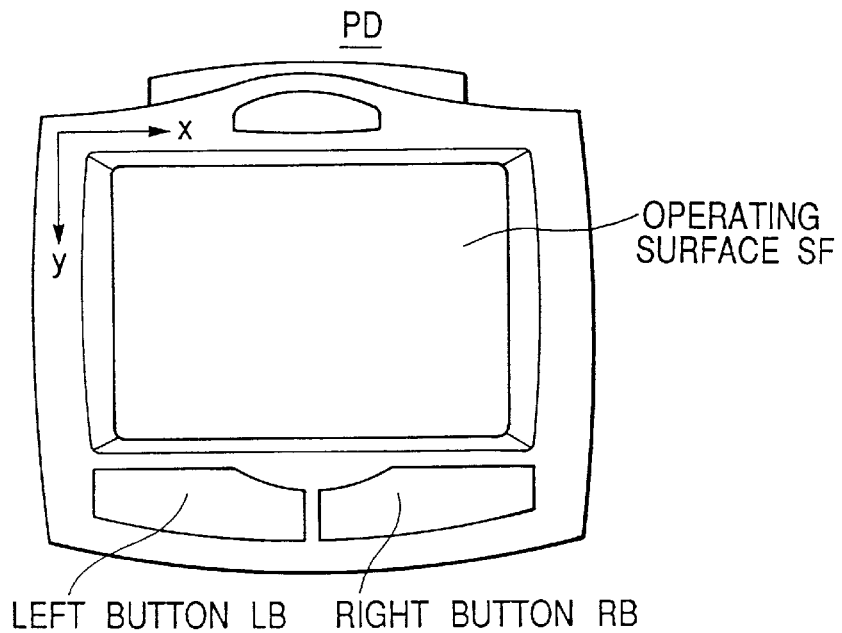
FIG. 2 is a plan view of a coordinates detection device PD of the embodiment.

At first the various structural components of the coordinates detection device PD will be described, however before this a basic description of the mechanical structure of the coordinates detection device PD will be given. FIG. 2 shows a plan view of the coordinates detection device PD. A left button LB and a right button RB correspond respectively to the left and right buttons of a mouse, having the same functions as those of the respective mouse buttons. A rectangular region indicated by a symbol SF indicates an operating surface operated by a coordinates pointer (not shown in FIG. 2). The coordinates pointer mentioned here may for example be the finger of a user, and hereunder is described as such.

A sensor substrate 1 shown in FIG. 1, has a plurality of horizontal scanning lines (in the X axis direction in FIG. 2) and vertical scanning lines (in the Y axis direction in FIG. 2) formed into a matrix shape, the construction being such that touching a finger on the operating surface SF, causes the value of the current flowing in the respective scanning lines to change. To explain in more detail, the coordinates detection device PD of the present embodiment employs a device referred to as an electrostatic capacity type tablet. This device has electrodes provided in matrix form on respective front and rear surfaces of an electrostatic film, and an electric field is formed by supplying a pulse signals from one side of the electrostatic film. Since with this arrangement touching the electrostatic film with the finger via the operating surface SF causes a drop in the electrostatic capacity of the touched portion, then converting the change in electrostatic capacity to a change in current value enables the position of the portion touched by the finger to be detected. That is to say, the coordinates position of the touched portion is indicated by the intersection of the horizontal scanning lines and the vertical scanning lines. Furthermore, if the separation of the finger after touching is detected, then the above-mentioned tapping operation can be detected. Moreover, the operation of sliding the finger on the operating surface SF can be detected by computing the positional change of the touched portion.

The pad need not be an electrostatic capacity type, but may for example adopt a pressure sensitive system or the like.

A horizontal scanning section 2 involves a circuit for horizontal scanning of the sensor substrate 1, and has a plurality of signal outputs connected to the horizontal scanning lines of the sensor substrate 1.

A vertical scanning section 3 involves a circuit for vertical scanning of the sensor substrate 1. This circuit has a plurality of signal inputs connected to the vertical scanning lines of the sensor substrate 1, and generates a serial detection signal showing the finger operating condition. The serial detection signal includes a tap component produced when the finger is tapped on the sensor substrate 1 via the operating surface SF, and a slide component produced when the finger is slid on the operating surface SF. The tap component includes an address component indicating the location on the operating surface SF where the finger contacts, while the slide component includes an address component indicating the "from and to" location of the finger sliding on the operating surface SF.

A control drive section 4 supplies respective scanning drive signals to the horizontal scanning section 2 and the vertical scanning section 3, to thereby drive the horizontal scanning section 2 and the vertical scanning section 3.

An A/D (analog/digital) conversion section 5 converts the serial detection signal generated by the vertical scanning section 3 into a digital signal.

A tap/slide component extraction section 6, extracts the before-mentioned tap component and slide component from the digital signal of the converted serial detection signal, and then separates these and converts them into three dimensional coordinates values, and outputs these coordinates values together with the tap component and the slide component.

A data processing section 7 determines whether or not tapping is being executed, based on the three dimensional coordinates values sent from the tap/slide component extraction section 6, and also eliminates noise from the slide component, thereby corrects the change in the finger position in the two dimensional coordinates (constituted by the X/Y axes) of the operating surface SF, into a smooth straight line or curve.

An interface section 8 involves a circuit for carrying out data transfer with the coordinates output device PC. Based on the information sent from the data processing section 7, the interface section 8 appends the tap ON/OFF information and the respective ON/OFF information related to the left button LB and the right button RB, for each of the corrected absolute coordinates (X, Y) of the two dimensional coordinates on the operating surface SF, and outputs this together with the tap component and the slide component, to an output port 9.

The various structural components of the coordinates output device PC will now be described.

An interface section 10 involves a circuit for carrying out data transfer with the coordinates detection device PD, receiving the above-mentioned respective information via an input port 11. If the coordinates output device PC is a personal computer, then the interface section 10 corresponds to the well-known serial port or the well-known mouse port.

A data analysis section 12 receives and analyzes information from the interface section 10 sent from the coordinates detection device PD. It carries out judgment processing such as determining if tapping is being executed, and if the finger is being slid within a range in a predetermined region of the operating surface SF. The judgment results are then sent to a data conversion section 13.

Based on the judgment results for the presence of tapping or finger sliding within a predetermined region analyzed by the data analysis section 12, the data conversion section 13 judges whether or not predetermined specific processing should be carried out. This predetermined processing involves for example, right button emulation processing and various processing in an Easy X mode. These processing will be discussed in detail later.

A mode conversion section 14 stores various set values for the coordinates input apparatus. The arrangement is such that the data conversion section 13 converts the contents of the processing based on the set values sent from the mode conversion section 14. As described hereunder, these set values are for example, the range in a region on the operating surface SF tapped by the user when carrying out various processing in the right button emulation mode or the Easy X mode, and settings for whether or not the user is to be notified by sound that the various processing are being carried out. The set values are set for example by the user in the mode conversion section 14, by known processing for operating the menu on the computer screen.

A control section 15 is a circuit for controlling the respective sections of the coordinates output device PC, with the exception of the interface section 10.

A display section 16 is for example the display unit of a personal computer. This displays various images such as a window or a cursor on a screen 16' (see FIGS. 4 and 5), following instructions from the control section 15.

A ROM (read only memory) 17 stores information such as the operating program for the control section 15, sound information used when a sound is generated from a sound source 19 (to be described later), the size of the operating surface SF itself specified by the format of the above-mentioned absolute coordinates (X, Y).

A RAM (random access memory) 18 is a memory circuit for temporarily holding data when the control section 15 is executing various processing.

The sound source 19 comprises for example a speaker and a speaker drive circuit, and generates various sounds based on sound information sent from the control section 15.

Next is a description of the operation of the coordinates input apparatus, with a preliminary description of the functions of the apparatus, to simplify understanding. With the coordinates input apparatus of the present embodiment, the user assigns a plurality of previously specified regions on the operating surface SF, and when tapping is executed on these regions, then respective previously determined processing corresponding to the tapped region is carried out.

One such processing is right button emulation. With this processing, clicking the right button RB (see FIG. 2) with the finger, is replaced by tapping within a range of a specified region on the operating surface SF for right button emulation. For this specified region, any region on the operating surface SF may be assigned. For example, the region at the upper left corner or the upper right corner of the operating surface SF may be considered.

Figure 3:
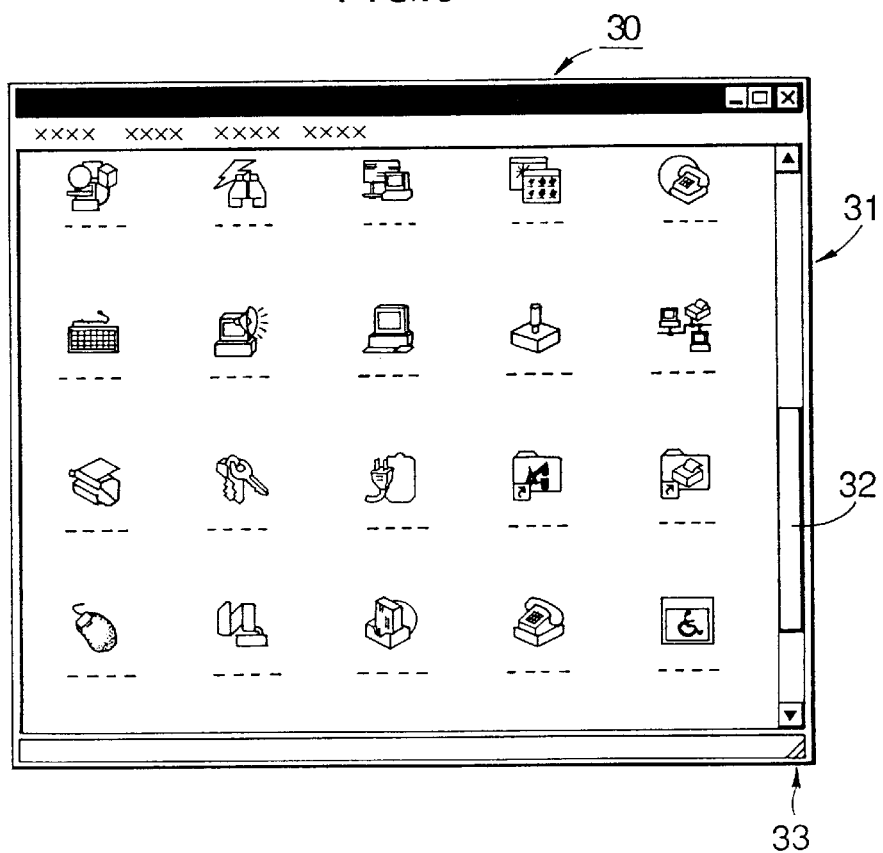
FIG. 3 illustrates an example of a window showing a display section 16.

In addition, a mode referred to as an Easy X mode is provided in the coordinates input apparatus of the present embodiment. This mode is for simplifying the various window operations carried out by the user, in the case of computers which basically employ an operation for a window 30 as shown in FIG. 3. On the other hand, with the present embodiment, there is a normal condition referred to as a Normal mode, different from the Easy X mode.

The coordinates input apparatus is set to this Normal mode, immediately after switching on the power or executing the reset sequence for coordinates input apparatus. Changing from the Normal mode to the Easy X mode is the same as for right button emulation, and is realized by tapping in a specified region on the operating surface SF. The specified region for the Easy X mode is of course set so as not to overlap the region set for the right button emulation. Continuous supervision of whether the current condition is for the Easy X mode or the Normal mode, is carried out using a flag provided in the RAM in the coordinates output device PC. If the flag is ON, the conditions are for the Easy X mode while if the flag is OFF the conditions are for the Normal mode.

Three types of function are provided for the Easy X mode. These functions are realized after tapping to change from the Normal mode to the Easy X mode, by carrying out predetermined operations corresponding to the functions.

A first function is referred to as Easy Scroll. This emulates the operation at the point in time of proceeding to the Easy X mode, for operating the scroll bar 31 (also referred to as the slide bar) for the currently active window 30 (refer to FIG. 3), to thereby scroll the contents displayed in the window 30. When the scroll bar 31 is provided on the right edge of the screen as shown in FIG. 3, then this function is carried out with the mode changed to the Easy X mode, by moving the finger to right edge of the operating surface SF as shown in FIG. 4 and then sliding the finger 50 in the up/down direction along the right edge. In this way, the slide amount and slide direction (UP<up> or DN<down> direction in FIG. 4) of the finger 50 in combination, are made the same as moving an index 32 of the scroll bar 31 in the vertical direction. The case may arise, depending on the window, where the scroll bar 31 is located for example at the bottom of the window 30. If in this case the finger 50 is slid along the bottom edge of the operating surface SF, then the operation of moving the index 32 in the horizontal direction can be emulated.

A second function is referred to as Easy Size. This emulates the operation for widening or narrowing of the window 30. This function is carried out with the mode changed to the Easy X mode, by placing the finger 50 near the center of the operating surface SF as shown in FIG. 5, and then sliding the finger at an angle towards the upper left corner or the lower right corner of the operating surface SF. In this way, the operation of moving the cursor to the size change corner 33 of the window 30, then moving the cursor to the upper left corner or the lower right corner while pressing the left button LB is emulated. The window 30 is then widened (the WD direction of FIG. 5) or narrowed (the NR direction of FIG. 5) corresponding to the slide amount and slide direction of the finger 50 sliding on the operating surface SF.

Figure 6:
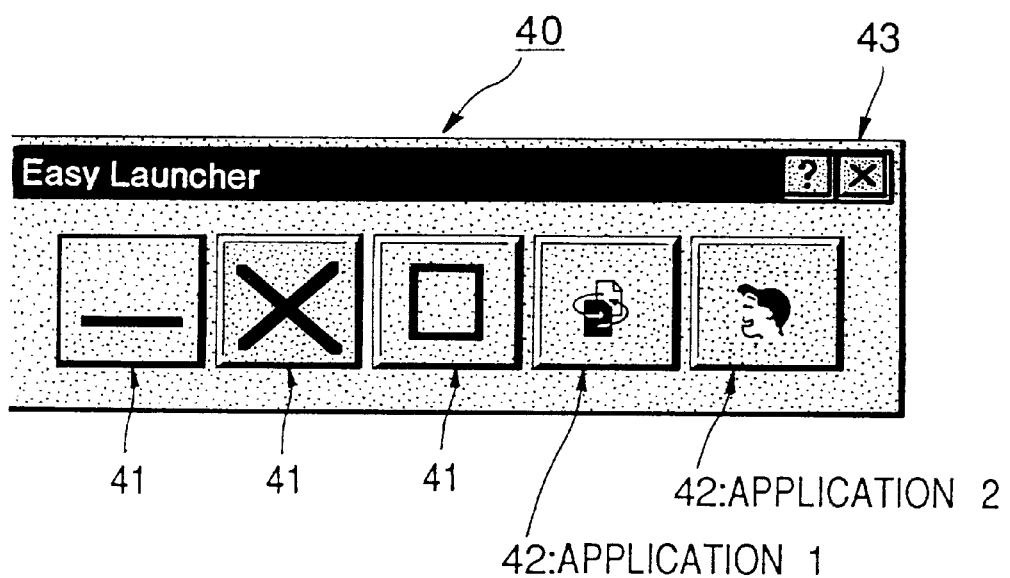
FIG. 6 illustrates an example of a dialog box shown on the screen in the Easy Launcher processing in the embodiment.

A third function is referred to as Easy Launcher. This function displays on the screen 16', as shown in FIG. 6, an enlarged dialog box 40 (a temporary window displaying specified information) in which is registered various buttons 41 and icons 42 (wherein the functions of the application program are simplified with pictures). The cursor moves automatically to inside the dialog box 40, and the various conventional processing corresponding to the button 41s or the icons 42 is executed by successively tapping on the button 41 or the icon 42. This an Easy Launcher is realized with the mode changed to the Easy X mode, by tapping in a specified region on the operating surface SF for a second time.

Here the specified region may be any region on the operating surface SF. In practice this may be made the same as the region set for changing to the Easy X mode. If set in this way, then the Easy Launcher can be started by tapping twice in succession, on the same specified region on the operating surface SF.

The function for the buttons 41 and the icons 42 in the dialog box 40 may be any suitable function, the following being given as an example. The function where the window which is active prior to appearance of the dialog box 40 is replaced with an icon previously assigned to this window, and this icon is pasted on the screen. Moreover, there is the function for closing the window which is active prior to appearance of the dialog box 40. Furthermore, there is the function for starting the various application programs by clicking on the buttons 41 or the icons 42.

Next is a description of the operation of the coordinates input apparatus constructed as described above.

At first, the user carries out a prior setting as described below for the coordinates output device PC. A first setting involves individually setting the regions for carrying out the respective tapping, corresponding to various functions of right button emulation, change to the Easy X mode, and Easy Launcher start. In this way, the ranges of the respective tapping regions are stored in the mode conversion section 14. Here the width of the regions is made wide enough to facilitate finger positioning, yet narrow enough to ensure that the finger 50 does not enter erroneously under normal operation. In this respect it is convenient to define the various regions at for example the corners of the operating surface SF. The range of the various regions is stipulated by the absolute coordinates (X, Y) with the upper left corner of the operating surface SF as the origin. As an example, the absolute coordinates of the upper left corner and the lower right corner of the respective regions are stored together in pairs.

A second setting involves setting for whether or not to generate a sound to advise the user at the time of tapping. This sound generation setting is variously carried out when tapping is executed for right button emulation, for changing to the Easy X mode, or for purposes other than these, and involves setting sounds of various different types. In this way, the settings for sound generation are stored in the mode conversion section 14 for each of the above mentioned three cases.

Processing for these settings is carried out by the user, for example by displaying a setting window on the screen. However since this operation involves well known conventional processing, detailed description is here omitted.

The operation of the coordinates input apparatus will now be described with reference to the flow charts of FIG. 7 and FIG. 8. In the following, the Normal mode is set for the initial condition.

Figure 7:
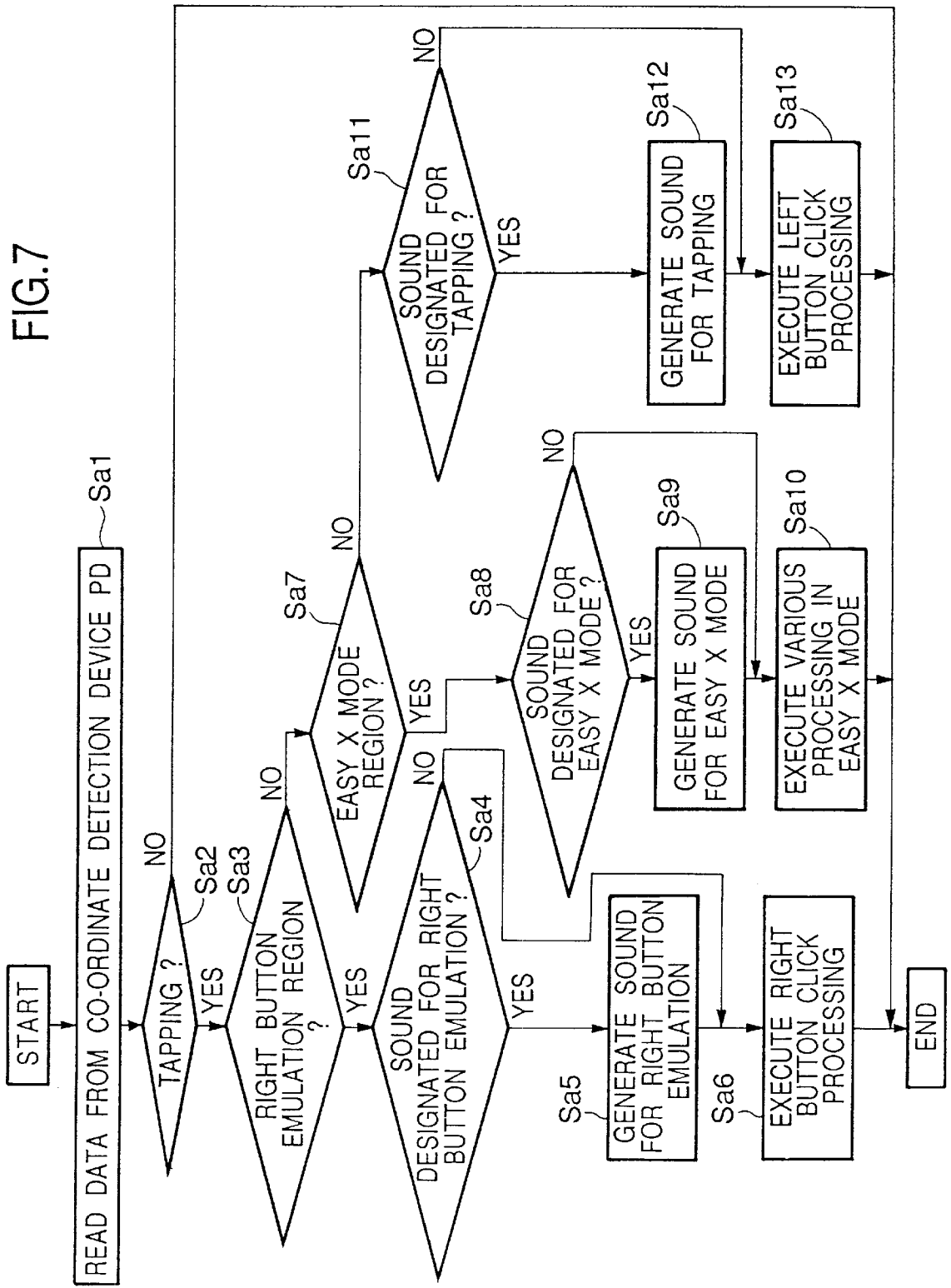
FIG. 7 is a flow chart for describing the operation of the coordinates input apparatus in the embodiment.
Figure 8:
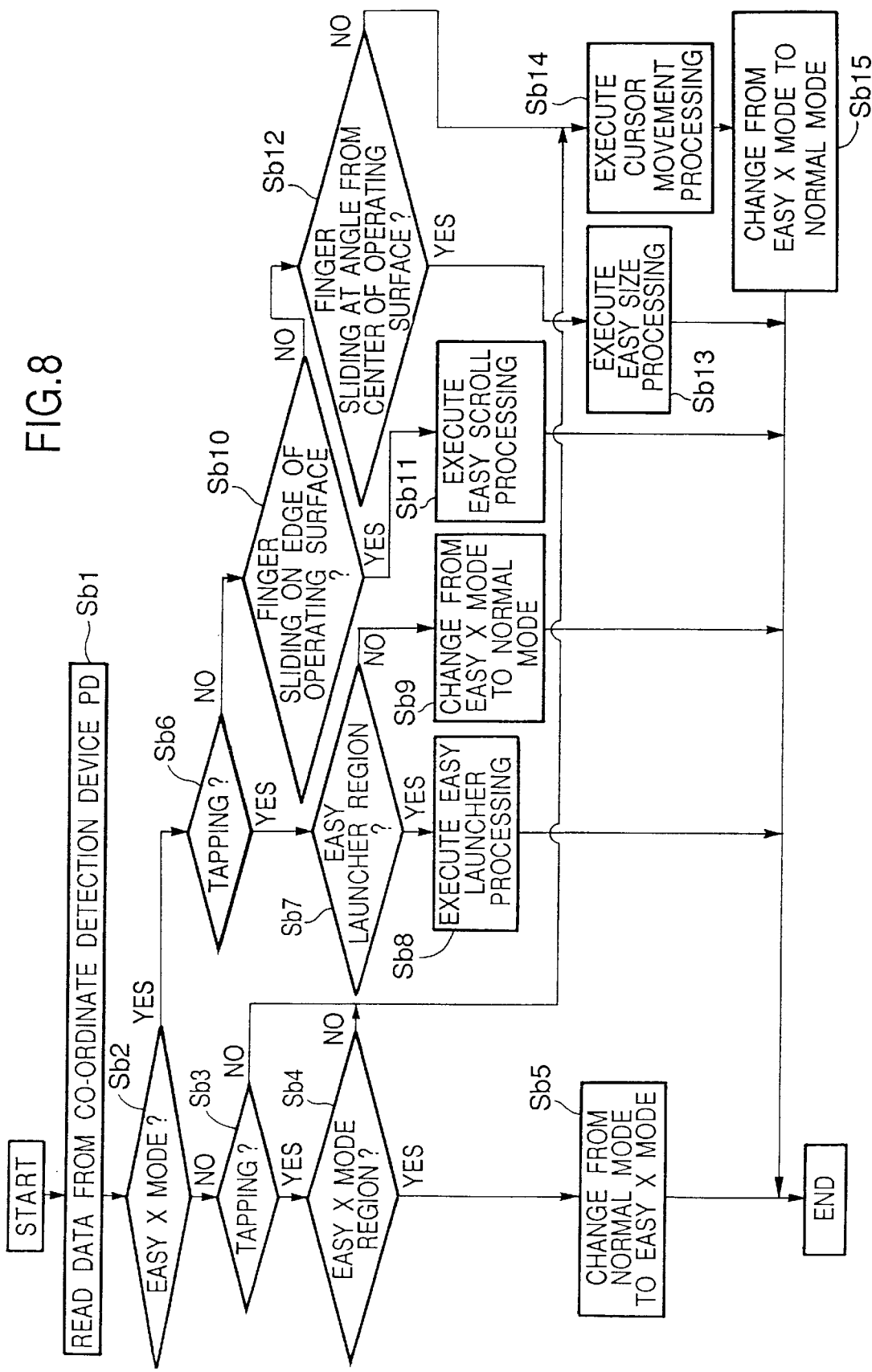
FIG. 8 is a flow chart for describing details of the operation of the Easy X mode in the coordinates input apparatus of the embodiment.

At first, in step Sa1 of FIG. 7, data transfer from the coordinates detection device PD to the coordinates output device PC is carried out. This transfer processing will be explained hereunder with reference to FIG. 1. In the coordinates detection device PD, the horizontal scanning section 2 and the vertical scanning section 3 are scan driven by the drive signal output from the control drive section 4. When scanning signals are being supplied from these scanning sections to the respective scanning lines of the sensor substrate 1, then if the user touches the finger 50 on a desired position on the sensor substrate 1 (that is to say the operating surface SF), a serial detection signal corresponding to the position touched by the finger 50, is output to the vertical scanning section 3. This serial detection signal is converted to a digital signal by the A/D converter section 5, and a tap component and slide component are extracted therefrom in the tap/slide component extraction section 6. The data processing section 7 then sends the tap component as is, to the interface section 8, and sends the slide component to the interface section 8 after first carrying out noise removal correction. The interface section 8 then generates tap ON/OFF information and button ON/OFF information, appends these information to the data sent from the data processing section 7, and then supplies this to the output port 9 for transmission to the coordinates output device PC.

In the coordinates output device PC, the information given to the input port 11 is supplied to the data analysis section 12 via the interface section 10. This completes the processing in the coordinates output device PC of transferring data from the coordinates detection device PD. With the conventional arrangement, the supplied tap component and slide component are sent to the control section 15. The control section 15 then carries out processing to convert these to suitable data for picture display, and supplies this to the display section 16. As a result, for example the appearance of the moving cursor on the screen of the display section 16 corresponds to movement of the finger 50 on the operating surface SF.

Then in FIG. 7, control proceeds to step Sa2, where the data analysis section 12 refers to the tap ON/OFF information included in the transferred information, and judges if tapping has been executed. If tapping has not been executed, then the processing is terminated as is, processing thus being executed the same as for the conventional arrangement. On the other hand, if tapping has been executed, then it is judged if the tapped position on the operating surface SF is within the range of some specified region designated beforehand by the user.

For this judgment, control first proceeds to step Sa3 where the data analysis section 12 judges if tapping has been carried out in the region for right button emulation. That is to say, the data analysis section 12 takes the absolute coordinates for the upper left corner and the lower right corner of the relevant region, stored in the mode conversion section 14. Here the absolute coordinates are assumed as (Xa, Ya) and (Xb, Yb). The data analysis section 12 then judges if the absolute coordinates (X, Y) of the tapped position satisfy Xa<X<Xb and Ya<Y<Yb, to thereby determine if the tapped position is within the region for right button emulation.

If the judgment result shows that the tapped position is within the designated range, then an operation the same as for when the right button RB is clicked is emulated. For this emulation, control first proceeds to step Sa4 where the data analysis section 12 accesses the mode conversion section 14 to judge if sound generation when right button emulation is recognized has been designated. If sound generation has been designated, the data analysis section 12 gives instructions to the data conversion section 13 for sound generation. Control therefore proceeds to step Sa5 where the data conversion section 13 extracts the sound type set for right button emulation, from the mode conversion section 14. The data conversion section 13 then outputs instructions to the control section 15 to read out sound information corresponding to the type of sound, from the ROM 17 and send this to the sound source 19 to generate a sound.

When the processing for sound generation of step Sa5 has been completed, or when in step Sa4, right button sound generation is not designated, control proceeds to step Sa6 where processing for when the right button RB is clicked is initiated. The processing corresponding to the right button depends on the application running, and since this involves conventional processing, description is here omitted.

Referring back to step Sa3, if the result of the judgment is that the tapped position is not within the range of the region for right button emulation, control proceeds to step Sa7. Then following the same procedure as for the processing of step Sa3, it is judged if the tapped position is within the range of the region for the Easy X mode.

If the tapped location is in the relevant region, control proceeds to step Sa8 where with the same processing as in Sa4, it is judged if sound generation when the Easy X mode is recognized has been designated. If sound generation has been designated, control proceeds to step Sa9 where, following the same procedure as for the processing of step Sa5, the sound prepared for the Easy X mode is generated from the sound source 19.

When the processing for sound generation of step Sa9 has been completed, or if in step Sa8, sound generation for the Easy X mode was not designated, control proceeds to step Sa10 where the various processing in the Easy X mode is carried out. Since this processing is described later in detail with reference to FIG. 8, description is here omitted.

Referring back to step Sa7, if the judgment is that the tapped position is also not in the region for the Easy X mode, then this means that the tapping is the conventional designated tapping corresponding to clicking the left button LB. Hence in this case control proceeds to step Sa11 where it is judged in the above-mentioned manner, if sound generation for tapping has been designated. If sound generation has been designated, control proceeds to step Sa12 where the sound for tapping is generated.

When the processing for sound generation of step Sa12 has been completed, or if in step Sa11 sound generation for tapping was not designated, control proceeds to step Sa13 where processing for when the left button LB is clicked is initiated. This processing also, as with the processing for when the right button RB is clicked, involves various processing, and details are omitted.

The operation of the coordinates input apparatus in relation to the Easy X mode, will now be described in detail with reference to FIG. 8. At first, in step Sb1, as with the above-mentioned step Sa1, data is transferred from the coordinates detection device PD.

Control then proceeds to step Sb2 where the data analysis section 12 examines, via the control section 15, the condition of the flag stored in the RAM 18 to determine if the apparatus is in the Normal mode or the Easy X mode condition. As mentioned above, at this point in time the apparatus is in the Normal mode and hence the flag is in the off condition. Control therefore proceeds to step Sb3 to judge, in the same way as for step Sa2, if tapping has been carried out. Here the judgment denotes that the user has tapped in the region for changing to the Easy X mode. Hence, control proceeds to step Sb4 where the data analysis section 12 verifies that the tapping is being carried out in the region for the Easy X mode, after which control continues on to step Sb5 where the flag is changed to the ON condition, and the apparatus is changed from the Normal mode to the Easy X mode.

After this, control again proceeds to step Sb1 to transfer data from the coordinates detection device PD, and then proceeds on to step Sb2. At this point in time, since the apparatus has been changed to the Easy X mode, control proceeds to step Sb6 to judge if tapping has been carried out. If tapping has been carried out (that is to say tapping has been carried out two times in succession), control proceeds to step Sb7 where it is judged if the tapped position is within the range of the region set for the Easy Launcher.

If so, control proceeds to step Sb8 to start the Easy Launcher processing. As a result, the data conversion section 13 outputs instructions to the control section 15 to display the screen corresponding to the dialog box 40 shown in FIG. 6 on the display section 16. Moreover, the data conversion section 13 outputs instructions to the control section 15 to start conventional cursor movement processing, to forcibly move the cursor to the dialog box 40. Thereupon, the user moves the cursor in the dialog box 40 and clicks on the desired button 41 or icon 42 to carry out processing such as; forming an icon for the window, closing the window, or starting up various applications. The Easy Launcher processing is then completed when the user either taps the operating surface SF, or clicks the close box 43 provided in the dialog box 40 using the left button LB.

If the judgment result in step Sb7 is that a second tapping has not been carried out in the region for the Easy Launcher, control proceeds to step Sb9 where the flag is changed to the OFF condition to cancel the Easy X mode and return to the Normal mode.

On the other hand, in the case where a second tap is not detected in the judgment processing in step Sb6, control proceeds to step Sb10. The data analysis section 12 then judges if the user is sliding the finger 50 on the right hand edge of the operating surface SF, based on information for the size of the operating surface SF, stored in the ROM 17.

If sliding operation is detected, control proceeds to step Sb11 to execute the Easy Scroll processing. That is to say, the data conversion section 13 computes the distance and direction that the user slides the finger 50, from the slide component taken from the data analysis section 12. The data conversion section 13 then outputs instructions to the control section 15 to move the index 32 of the scroll bar 31 shown in FIG. 3 in the vertical direction corresponding to the computed distance and direction, and to simultaneously scroll the contents displayed on the window 30 in proportion to the amount of movement of the index 32. Since this involves conventional processing, description is here omitted.

On the other hand, if in step Sb10, sliding on the right hand edge of the operating surface SF is not detected, control proceeds to step Sb12 where the data analysis section 12 determines if the user has slid their finger at an angle from near the center of the operating surface SF to the upper left corner or the lower right corner.

If this sliding operation is detected, control proceeds to step Sb13 to execute the Easy Size processing. That is to say, the data conversion section 13 starts the conventional cursor movement processing via the control section 15, to move the cursor to the size change corner 33 of the window 30. The data conversion section 13 then computes the distance and direction that the user slides the finger 50, based on the slide component obtained from the data analysis section 12, and moves the position of the size change corner 33 (for example the bottom right corner of the window 30) correspondingly so that the window 30 is widened or narrowed, and starts the cursor movement processing so that the cursor remains at the size change corner 33, simultaneously following the changing size of the window 30. Since this processing is also conventional processing, detailed description is here omitted.

On the other hand, if in step Sb12, the expected slide operation is not detected, control proceeds to step Sb14. The data conversion section 13 then examines the slide component, and determines if the operation of sliding the finger 50 on the operating surface SF is being carried out. If so, the cursor is moved on the screen in accordance with the movement of the finger 50. When this processing is completed, control proceeds to Sb15 where the flag is changed to the OFF condition to cancel the Easy X mode and return to the Normal mode.

Referring back to step Sb3 and step Sb4, when in step Sb3 tapping is not detected, and when in step Sb4 tapping is not carried out in the region for the Easy X mode, then the processing set of steps Sb14 and Sb15 is executed. The former processing is a simple cursor movement operation, while the latter corresponds to the tapping operation equivalent to clicking the left button LB. Consequently, when this simple cursor movement operation, or tapping equivalent to clicking the left button LB is executed after carrying out any one of the Easy Launcher, Easy Scroll, or Easy Size, then the apparatus returns to the Normal mode.

As described above the operation corresponding to clicking the right button click is realized by tapping once with one finger. Hence it is not necessary to move the finger away from the operating surface SF, thus negating the requirement for two or more fingers to operate the apparatus.

Moreover, operations such as forming an icon for the window, window scroll processing, or starting up specific applications, can be carried out by tapping the operating surface SF twice to display the dialog box, then moving the cursor (namely, finger) a short distance on the operating surface and tapping for the button or the icon. Consequently, there is no requirement as with the conventional arrangement to move the cursor to the corner of the window, and also the complex operation of positioning in the close box is unnecessary.

Furthermore, the operation for the scroll bar provided in the window is executed by a series of operations of; tapping once, moving the finger to the edge of the operating surface SF, and sliding the finger on the edge. Consequently, it is not necessary to carry out the complex operation of positioning the cursor on the scroll bar. Moreover, since the finger sliding operation is always carried out on the edge of the operating surface, the finger can be simply moved to the edge of the control surface without the need for intricate positioning, thus relieving the load on the user.

In addition, window size adjustment is realized by tapping once and then sliding at an angle on the operating surface. Consequently, it is not necessary to carry out the complex operation of positioning the cursor in the size change corner of the window.

What is claimed is:

1. A coordinates input apparatus, comprising:
   a detection device comprising an operating surface for operation by a coordinates pointer, said detection device detecting an operating condition on said operating surface caused by said coordinates pointer;
   said operating surface comprises:
      a first region where a motion of a cursor is controlled by a sliding operation of a coordinates pointer; and
      a second region where a specific predetermined processing is carried out by a tapping operation within said second region, wherein said tapping operation causes said second region to become a part of said first region and a function different than moving a cursor is executed through a sliding operation and a tapping operation of the coordinates pointer within the combined first and second regions and a setting of either a range of the second region or its position can be changed within the first region through said operating surface;
   an operating device that executes screen operations corresponding to said operating condition and detects tapping of said coordinates pointer on said operating surface within said second region, and carries out previously determined processing; and
   a device that defines said second region of said operating surface to be tapped by said coordinates pointer.

2. A coordinates input apparatus according to claim 1, wherein said second region is large enough to be touched with a finger; and
   said first region is positioned in either an upper left corner or an upper right corner of said operating surface.

3. A coordinates input apparatus, comprising:
   a detection device comprising an operating surface for operation by a coordinates pointer, and for detecting an operating condition on said operation surface caused by said coordinates pointer;
   said operating surface comprises:
      a first region where a motion of a cursor is controlled by a sliding operation of a coordinates pointer; and
      a second region where a specific predetermined processing is carried out by a tapping operation wherein said tapping operation causes said second region to become a part of said first region and a function different than moving a cursor is executed through a sliding operation and a tapping operation of the coordinates pointer within the combined first and second regions;
   an operating device that executes screen operations corresponding to said operating condition and detects tapping of said coordinates pointer on said operating surface within said second region, and changes to a previously determined mode, wherein said operating device, after changing to said previously determined mode, detects if said coordinates pointer is again tapped within said second region, and carries out said predetermined processing; and
   a device that defines said second region of said operating surface to be tapped by said coordinates pointer.

4. A coordinates input apparatus according to claim 3, wherein said second region is large enough to be touched with a finger; and
   said second region to be tapped for changing the present mode into said previously determined mode, and said second region to be tapped again after the mode change are positioned in the same region; and
   wherein the setting of either a range of said second region or a position of said second region can be changed within said first region.

5. A coordinates input apparatus according to claim 3, wherein said predetermined processing is processing to display a predetermined dialog box on a screen and an enlarged image of said predetermined dialog box is displayed on said screen.

6. A coordinates input apparatus according to claim 5, wherein said predetermined dialog box includes at least one of: a button for forming an icon for a window displayed on said screen, a button for closing a window displayed on said screen, or an icon for starting up various applications.

7. A coordinates input apparatus according to claim 3, comprising a notifying device that notifies, at the time of carrying out said specific predetermined processing, that said predetermined processing is being carried out.

8. A coordinates input apparatus according to claim 7, wherein said notifying device carries out notification by generating a sound which has been set corresponding said specific predetermined processing.

9. A coordinates input apparatus according to claim 7, wherein whether or not to carry out said notification is set for each of said specific predetermined processing.

10. A coordinates input apparatus, comprising:
   a detection device comprising an operating surface for operation by a coordinates pointer, said detection device detecting an operating condition on said operating surface caused by said coordinates pointer;
   said operating surface comprises:
      a first region where a motion of a cursor is controlled by a sliding operation of a coordinates pointer;
      a second region where a specific predetermined processing is carried out by a tapping operation, wherein said tapping operation causes said second region to become a part of said first region and a second predetermined processing is executed through a sliding operation and a tapping operation of the coordinates pointer within the combined first and second regions; and
   an operating device that executes screen operations corresponding to said operating condition and detects tapping of said coordinates pointer on said operating surface within said second region whose position and range can be changed on said operating surface, and carries out previously determined processing;
   wherein said operating means, after changing to said previously determined mode, detects if a specific slide operation is being carried out by said coordinates pointer on said operating surface, and carries out predetermined processing.

11. A coordinates input apparatus according to claim 10, wherein said slide operation involves sliding said coordinates pointer along an edge of said operating surface,
   and said specific predetermined processing is processing to scroll the contents of a window displayed on a screen, corresponding to the position on said edge of said operating surface and the movement of said coordinates pointer.

12. A coordinates input apparatus according to claim 10, wherein said slide operation involves sliding said coordinates pointer from near a center of said operating surface towards an outer edge portion of said operating surface, and
   said specific predetermined processing is processing to adjust the size of a window displayed on a screen corresponding to movement of said coordinates pointer by said slide operation.

13. A coordinate input apparatus comprising:
   a coordinates detecting device comprising:
      a sensor for detecting an operating state of a coordinates pointer;
      a tap extracting section for extracting tap information from said coordinates pointer and/or slide information in reference to an output signal sent from said sensor; and
      an interface section for outputting data, including said tap information and/or said slide information; and
   a coordinates output device comprising:
      a control section for calculating a set of coordinates of said coordinates pointer on the basis of said data sent from said coordinates detecting device and controlling a displayed position of a cursor in response to said calculation;
      a data conversion section for discriminating whether or not a specified processing should be carried out in reference to a presence or a non-presence of said coordinates pointer at a predetermined region whose position and size can be changed on said operating surface on the basis of said tap information; and
      a device that defines said predetermined region as a part of said sensor, wherein an executing process is varied by tapping of said predetermined region by said coordinates pointer.

14. A coordinates input apparatus according to claim 1, wherein said second region is used as a right button emulation region in which tapping executes processing corresponding to right button clicking.

* * * * *

UNITED STATES PATENT AND TRADEMARK OFFICE
CERTIFICATE OF CORRECTION

PATENT NO.    : 5,995,083
DATED         : November 30, 1999
INVENTOR(S)   : Tadamitsu Sato et al.

It is certified that error appears in the above-identified patent and that said Letters Patent is hereby corrected as shown below:

Title page,
Item [73], Assignee, after "Ltd.," insert -- Tokyo, --.
Item [56], References Cited, U.S. PATENT DOCUMENTS,
After line 1, insert the following:
-- 5,119,079    6/1992    Hube et al.        345/173
   5,272,470   12/1993    Zetts              345/173 --.

After line 2, insert the following:
-- 5,404,458    4/1995    Zetts              395/275 --.

After line 3, insert the following:
-- 5,570,113   10/1996    Zetts              345/173
   5,621,438    4/1997    Kamimura et al.    345/178
   5,677,711   10/1997    Kuo                345/173 --.

Column 12,
Line 23, immediately after "operation" insert -- , -- (comma).
Line 65, after "said" insert -- specific --.

Signed and Sealed this

First Day of October, 2002

Attest:

Attesting Officer

JAMES E. ROGAN
Director of the United States Patent and Trademark Office